(12) United States Patent
Doughty et al.

(10) Patent No.: US 8,949,866 B2
(45) Date of Patent: Feb. 3, 2015

(54) OBJECT-ORIENTED CLASS HIERARCHY FOR WORKFLOW EXECUTION TARGETS

(71) Applicant: Cisco Technology, Inc., San Jose, CA (US)

(72) Inventors: Mark Steven Doughty, Houston, TX (US); Dary Von Jones, Sugar Land, TX (US); Svetlana Kryukova, Houston, TX (US); John Miller Abney, III, Bellaire, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/047,853

(22) Filed: Oct. 7, 2013

(65) Prior Publication Data

US 2014/0337865 A1     Nov. 13, 2014

Related U.S. Application Data

(60) Provisional application No. 61/822,737, filed on May 13, 2013.

(51) Int. Cl.
G06F 13/00     (2006.01)
G06F 9/54      (2006.01)

(52) U.S. Cl.
CPC .................................... *G06F 9/541* (2013.01)
USPC ........................................................ 719/328

(58) Field of Classification Search
CPC ...................................................... G06F 9/541
USPC ........................................................ 719/328
See application file for complete search history.

(56) References Cited

U.S. PATENT DOCUMENTS

2003/0061292 A1* 3/2003 Underseth et al. ............ 709/206
2009/0125919 A1* 5/2009 Meijer et al. .................. 719/328
2010/0175075 A1* 7/2010 Acedo et al. .................. 719/328
2014/0059210 A1* 2/2014 Gedik et al. ................... 709/224

* cited by examiner

*Primary Examiner* — Andy Ho
(74) *Attorney, Agent, or Firm* — Patent Capital Group

(57) ABSTRACT

A method is provided for managing an application program interface and may include identifying a creation of a new target type in an orchestrator, wherein the orchestrator has the application programming interface; identifying a set of properties of the new target type; and generating a new routine in the application program interface using the set of properties.

20 Claims, 3 Drawing Sheets

OBJECT-ORIENTED CLASS HIERARCHY FOR WORKFLOW EXECUTION TARGETS

CROSS-REFERENCE TO RELATED APPLICATIONS

This application claims priority to U.S. Provisional Application [Ser. No. 61/822,737] filed May 13, 2013 and entitled 'OBJECT-ORIENTED CLASS HIERARCHY FOR WORKFLOW EXECUTION TARGETS', which is incorporated by reference in its entirety.

TECHNICAL FIELD

This disclosure relates in general to communications and, more particularly, to managing an object-oriented class hierarchy for workflow execution targets.

BACKGROUND

Orchestration describes the automated arrangement, coordination, and management of complex computer systems, middleware, and services. This usage of orchestration is often discussed in the context of service oriented architecture, virtualization, provisioning, converged infrastructure, and dynamic datacenter topics. Orchestration in this general sense can include aligning the business request with the applications, data, and infrastructure. It defines the policies and service levels through automated workflows, provisioning, and change management. This creates an application-aligned infrastructure that can be scaled up or down based on the needs of each application. Orchestration also provides centralized management of the resource pool, including billing, metering, and chargeback for consumption.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided for managing an application program interface and may include identifying a creation of a new target type in an orchestrator that corresponds to an element of the information technology (IT) landscape. In at least one embodiment, the method can include identifying a creation of a new target type in an orchestrator, which includes the application program interface and which executes a process. The new target type can be associated with an object, deliverable, resultant, process, server, etc. The method can also include identifying a set of properties of the new target type, where the process has access to the set of properties, which may include any characteristic, parameter, attribute, capability, etc. The method also includes generating a new routine in the application program interface for the process using the set of properties, which previously existed.

In other examples, the method can include creating a derived execution target subtype based on the new target type; and creating additional properties that would be accessible for the derived execution target subtype, where the derived execution target subtype maintains to the set of properties for the new target type. Additionally, a new process that executes on the new target type can also execute on the derived execution target subtype. In addition, generating the new routine in the application program interface using the set of properties can include generating a name of the new routine using a property of the set of properties of the new target type. The property can be, for example, a name of the new target type. The new target type can be, for example, a user-defined target type. In certain examples, the method can further include identifying a removal of the new target type and removing the new routine of the application program interface. In certain cases, the method could also include identifying a change in the set of properties of the new target type; and updating the new routine of the application program interface based on the change. The new routine that was generated using the set of properties can have a different authorship from an original routine that previously existed and that included the set of properties.

Example Embodiments

Figure 1:
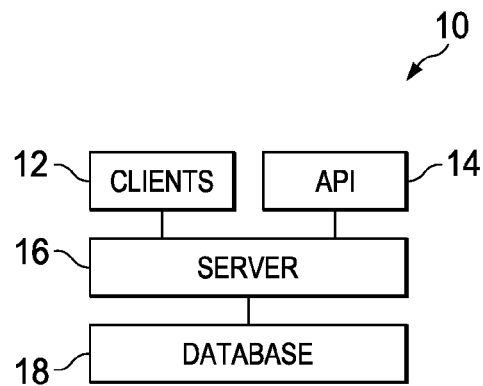
FIG. 1 is a simplified block diagram of an implementation of a computing environment in accordance with one example embodiment.

FIG. 1 is a simplified block diagram of an implementation of a communication system 10 for managing an object-oriented class hierarchy for workflow execution targets in accordance with one example embodiment. Communication system 10 may include clients 12, an application program interface (API) 14, a server 16, and a database 18. In an embodiment, clients 12 may be coupled directly or indirectly through one or more networks to a router, which may be coupled to a data center comprising one or more switches and server 16. Clients 12 may comprise a Windows® client, web client, or some other type of client. Clients 12 may communicate with server 16, and therefore, a process orchestration engine within server 16, through a web tier (internal communication layer).

In a specific embodiment, API 14 may be part of a web services communication layer. Through API 14, third party applications may communicate with server 16 and, therefore, any suitable process orchestration engine within server 16. Server 16 may be a group of servers and part of an orchestration tier. These servers may communicate with different types of directory services. In a specific embodiment, database 18 may be a group of servers and part of a data tier. Database 18 may include high availability clusters, among other types of servers. Database 18 may readily communicate with server 16 using any suitable protocol.

Before turning to some of the operational activities associated with communication system 10, it is important to understand some of the more typical workflows that may propagate through a cloud architecture. Such information is offered earnestly and, therefore, should not be construed in any way to limit the broad teachings of the present disclosure. Cloud automation best practice is auguring toward a model-driven automation as a paradigm for automation within the cloud. This allows an object-centric or a data-centric paradigm for automation that extends beyond the existing process, workflow, or procedural generation of orchestration products. When executing a process/workflow in an orchestration engine, an execution target is typically required to be selected for an instance in which the process/workflow is to be executed. Certain examples of execution target types can include a Windows Computer, a SQL Server Database, an Oracle Database, or a Web Service endpoint. Orchestration products typically understand a set of built-in execution target types, but cannot represent each single execution target type an end-user may seek to model. Furthermore, automation scenarios should act on higher-level services. Higher-level services are often systems of related lower level services, which are supported ultimately by hardware and software that hosts them. In such endeavors, one objective is to model and then execute a process/workflow against any sort of target the end-user might be able to conceive.

For example, a service like accounts payable may be moved to a cloud platform. The accounts payable service is primarily an application, though it may also have individualistic (i.e., human) and process elements. Such an application decomposes into a web tier with several web servers and a load balancer, an application tier with multiple application servers for redundancy, and a data tier with a database and a relationship to storage. Each of these service components may run on elements of the cloud such as a virtual machine (VM) for the web server, a physical server for the database, or a network virtual routing and forwarding (VRF) for the load balancer. Hence, there is a complex data model for the service for which automation is sought against. Each of these elements might not be represented by a built-in target type. The user should be able to define such a target/object type and, further, then execute a process/workflow against this new target type. Workflow-based automation tools should be augmented with object-oriented capabilities.

Within model-driven automation, data defines the desired state that the customer seeks (e.g., a service catalog order). Provisioning automation can traverse the system of objects, to break the complex model into smaller blocks, order actions, and subsequently build up the complex system from its simpler building blocks. Traditionally, process orchestration products may know about a set of built-in (from the manufacturer) execution target types, but may not represent every execution target type an end-user might want to model. IT automation scenarios need to act on higher-level services that IT provides. Higher-level services may be systems of related lower level services, supported ultimately by hardware and software that hosts them. The need is to model and then execute a process/workflow against any sort of target type the end-user might desire. This raises the automation from acting on lower level elements to acting on unique higher-level services that may be custom to that user's business and that cannot be pre-built into the orchestration product shipped by a third-party vendor.

Hence, common process orchestrators and workflow products fail to formalize the concept of an execution target. In any individual step in the workflow, the required information is captured directly within a customer-specific workflow or it is stored in an arbitrary database. For example, the name of the computer to execute a command and the credentials required to execute that command may be hard-coded in the workflow.

Extending beyond the target capability, an orchestration system can offer object or data-centric approaches to allow for model-driven automation.

In accordance with the teachings of the present disclosure, an application is provided for the object-oriented principles of inheritance and subtyping for process/workflow execution targets. Additionally, communication system 10 can offer support for model-driven automation that is unified with process orchestration. In at least one example, such an architecture can provide the ability to represent various objects as a process/workflow execution target. In contrast to platforms that restricted the list of process/workflow execution targets to a list of predefined (already known) target types, embodiments of the present disclosure can allow process/workflow execution against anything conceived by the end-user.

Hence, certain embodiments of the present disclosure can offer an orchestration system that allows definition of new object types to allow for model-driven automation. More specifically, some example embodiments relate to how user defined target types are accessible by an API, and how unique API routines are generated for each unique target type. Additionally, certain embodiments of the present disclosure can provide for ordered elements and desired state data models that are directly integrated with automation. In certain cases, there is a separation of implementation vs. desired state (e.g., a distinction between the effective "what" from the "how" of the system). In at least one implementation, a simpler visualization of why automation is occurring can be provided. In addition, there is an ability to change implementations and still satisfy the desired state definition. In more practical terms, there can be a field extensibility of shipped models and automation against them, including the ability to upgrade, if so desired. Such a system does not reflect a simplistic one time provisioning action that would otherwise be problematic.

In operation, an end-user (or the system itself) can continually monitor the environment vs. the model and bring them in line with any suitable policy (e.g., if an individual makes a manual change outside of the system). For example, if an individual replaces a device or a tool, the configuration can be repopulated. Additionally, an entire system can be moved to a new environment or site.

The architecture of communication system 10 can extend models to span tools and expand tool capabilities. Certain example embodiments can build a model that spans model-driven automation tools (e.g., network services manager, rPath™, etc.) and non-model-driven tools (e.g., storage element managers), and can add missing/appropriate features for each. The architecture can also provide service assurance awareness of modeled relationships and dependencies. A significant understanding of the services that can be supported by a piece of hardware or a tool (e.g., vCenter) can also be achieved. This could be valuable in better understanding the impact of failures. The architecture can also store state information, where appropriate.

Figure 2:
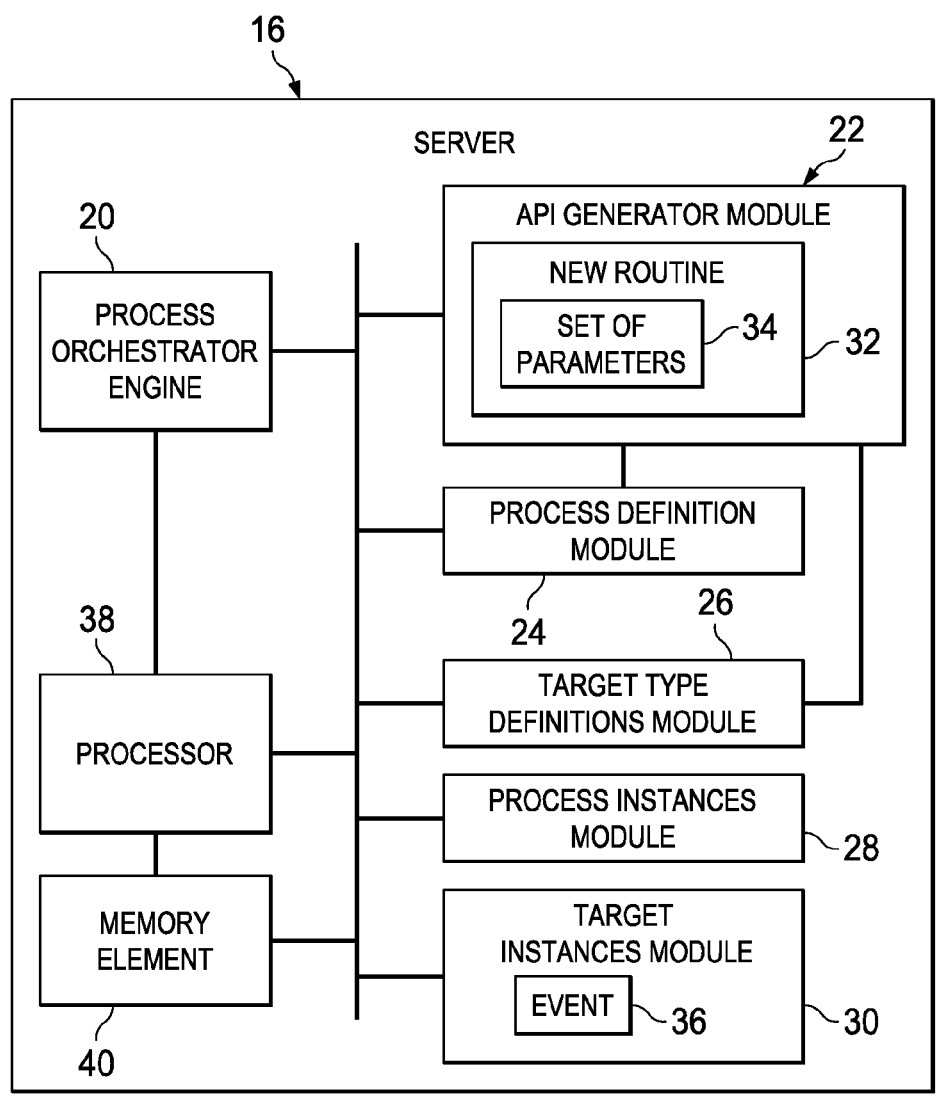
FIG. 2 is a simplified block diagram of an implementation of server in accordance with one example embodiment.

FIG. 2 is a simplified block diagram of an implementation of server 16 in accordance with one example embodiment. Server 16 may include a process orchestrator engine 20, an API generator module 22, a process definition module 24, a target type definitions module 26, a process instances module 28, and a target instances module 30. Process orchestrator engine 20 may be configured to perform automated arrangement, coordination, and management of modules (such as any of modules 22-30), complex computer systems, middleware, and services. Process orchestrator engine 20 defines the policies and service levels through automated workflows, such as provisioning and change management. This creates an application-aligned infrastructure that can be scaled up or down based on the needs of each application. Process orchestrator engine 20 also provides centralized management of the resource pool, including billing, metering, and chargeback for consumption. Server 16 may include more or less modules than shown here in FIG. 2. Additionally, each module may communicate with a database, such as database 18 to perform its operations.

In an example embodiment, API generator module 22 may be configured to generate API routines. API routines may also be referred to as methods, algorithms, or processes. API generator module 22 may use process definitions module 24 and target type definitions module 26 to generate a new routine 32. New routine 32 may be an API routine in certain example embodiments. New routine 32 may then be used for third party applications to talk to process instances module 28, target instances module 30, and process orchestration engine 20, among other systems. API generator module 22 utilizes a new target type to create new routine 32 that is then used by third party applications to interact with a system.

For example, API generator module 22 may take the name of a new target type and use that name as the name for new routine 32. Additionally, API generator module 22 may take other properties of the target type and generate a set of parameters 34 for new routine 32. The set of parameters may have labels and names for each parameter taken from the properties of the target type.

Certain embodiments of the present disclosure can apply aspects of an object-oriented programming inheritance paradigm to an execution target and execution target types. An execution target type can define the set of properties that would be available for setting for any execution target instance. A user could then create/derive a subtype and add new properties that would be available to that subtype. Through inheritance, the subtype can still have access to its base type's properties. Any process/workflow that could execute on the original execution target type could also execute on the derived execution target subtype. The subtype can include any instance of the parent type, as well as a specialized type. The process/workflow can have access to the execution target type properties and can make intelligent decisions based upon these properties. Because new execution target types can be created (also with new execution target type properties), processes/workflows can be created to robustly execute against any conceivable execution target type.

Additionally, these types can then be expanded to describe systems of related objects, called 'models' as discussed herein. Relationships can allow any combination of these objects to form systems and services. Relationships can be named such as "hosted by" or "source resource pool." As with all automation in an orchestrator, models, object instances, individual type definitions, etc. can be defined in "content." This can be thought of as configuration data of the platform vs. the orchestrator platform itself. In at least one example, the content, as opposed to the platform, can define models. The platform is open to any model sought to be produced.

Example embodiments of the present disclosure can be expanded to offer a data-centric view of automation beyond the prior process-centric view. This drives a paradigm shift in how an individual views and interacts with automation. An end-user can view targets/objects and verify which actions (like methods) the end-user can perform against them, or view the history of automation as it relates to a particular target or type.

In certain implementations, targets/objects have corresponding events. Additionally, certain embodiments can extend prior process events features to be aware of custom target types, and to be able to constrain processes that trigger from these events to objects of a specified type.

The system is extensible by services, partners, and customers. Some types, actions, properties, etc. may come from packaged content (e.g., automation packs). For example, several base types can be provided. Other content may come from services team 1, such as new types, new properties that are packaged types, or types that inherit from a certain platform. Services team 2, a partner, or a customer may further extend the types, properties, and object instances. This provides the ability to assemble a complex model from parts, each with their own authors managing version control and lifecycle. Furthermore, the ability to ship new types, new events related to these types, etc. to form a shipped model is effectively being accommodated.

In at least one example embodiment, the model elements implicitly have a consistent northbound application program interface (API), even if the model, target types, actions, properties, relationships, etc. come from different authors. Example embodiments can add the capability to perform creates, reads, updates, and deletes of object instances of these new custom types from within the northbound API.

In terms of its internal structure, server 16 may include a processor 38 and a memory element 40. In different example implementations, the activities outlined herein may be implemented by logic encoded in one or more tangible media, which may include non-transitory media. For example, the activities outlined herein may be implemented by embedded logic provided in an application specific integrated circuit (ASIC), digital signal processor (DSP) instructions, software (potentially inclusive of object code and source code), firmware, and/or hardware to be executed by a processor 38, or other similar machine, etc. In some of these instances, memory element 40 can store data used for the operations described herein. This includes memory element 40 being able to store software, logic, code, or processor instructions that are executed to carry out the activities described in this Specification.

Processor 38 can execute any type of instructions associated with the data to achieve the operations detailed herein in this Specification. In one example, a processor could transform an element or an article (e.g., data) from one state or thing to another state or thing. In another example, the activities outlined herein may be implemented with fixed logic or programmable logic (e.g., software/computer instructions executed by processor 38) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof. Any of the potential processing elements, modules, and machines described in this Specification should be construed as being encompassed within the broad term 'processor.'

The computer elements in server 16 and database 18 may further keep information, to be used in achieving the activities as discussed herein, in any suitable memory element, such as memory element 40 (e.g., random access memory (RAM), read only memory (ROM), EPROM, EEPROM, ASIC, a disk drive, a floppy disk, a compact disk ROM (CD-ROM), a digital versatile disk (DVD), flash memory, a magneto-optical disk, other types of nonvolatile machine-readable media that are capable of storing data and information, etc.), software, hardware, firmware, or in any other suitable component, device, element, or object where appropriate and based on particular needs. Moreover, the information being used, tracked, sent, or received in server 16 and database 18 could be provided in any database, register, queue, table, cache, or other storage structure, all of which can be provided in any suitable timeframe. Any of the memory items or storage options may be included within the broad term 'memory element' as used herein.

Figure 3:
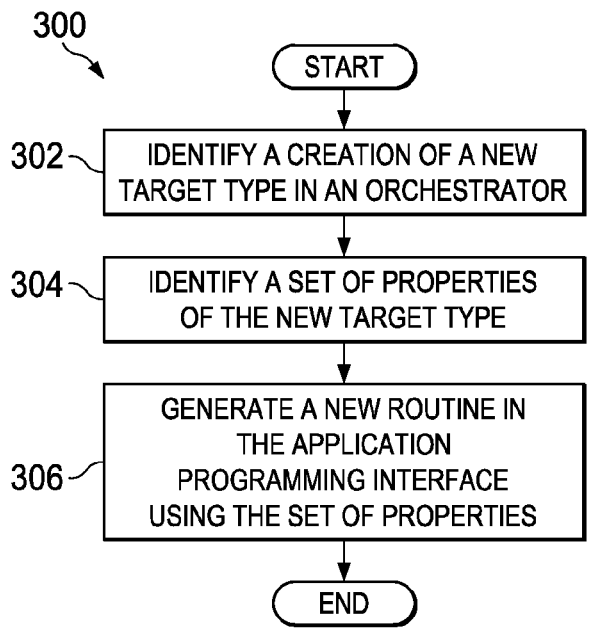
FIG. 3 is a simplified flowchart illustrating a method for managing an application program interface (API) in accordance with one example embodiment.

FIG. 3 is a simplified flowchart illustrating a method for managing an application program interface (API) in accordance with one example embodiment. A flow 300 may begin at step 302, where an API generator module may identify a creation of a new target type in the orchestrator. For example, the new target type may be a "Router." The new target type may be a user-defined target type or a core target type. The target type may be identified by receiving a user input, an update file, or in another manner. In a specific embodiment, the target type may define a service IT provides to the business or a specific element that supports that service. The orchestrator may include an API.

At step 304, the API generator module may identify a set of properties of the new target type. At step 306, the API generator module may generate a new routine in the API using the set of properties. In an example, when generating a new routine, the API generator module may generate a new name of the new routine using a property of the set of properties of the new target type. In a further example, the property is a name of the new target type. In yet a further example, the routine may have a set of parameters. In this example, the API generator module may generate a parameter name for each of the parameters of the routine using the set of properties of the new target type. In yet another embodiment, flow 300 may include an API generator module configured to identify a change in the set of properties of the new target type. In response to the change, the API generator may change the new routine of the API based on the change.

In operational terminology, users and automation pack authors can control which target types are published to an application program interface. An automation pack is a collection of configuration objects for an orchestrator that can be "imported" into the product. System providers, partners, services, and customers can create automation packs and take them from system to system. In different embodiments, automation packs may also be referred to as "update files."

For published objects, an orchestrator may expose the type uniquely in the northbound web service. As product teams, services, partners, or customers extend types, these APIs are maintained to provide a consistent format for APIs across all types of objects. However, each type of object is uniquely supported. All properties are automatically accessible via the northbound web service as optional parameters, in the per-type web service definition language (WSDL).

In a typical application program interface, the application may provide a static unchanging interface to interact with all or some subset of its components. However, when a user is allowed to define an arbitrary set of models all with properties and relationships to other models (which can be referred to as a model topology), a static unchanging interface becomes difficult to use.

In currently existing systems, a static unchanging interface for a service topology may appear as:
CreateTarget(string targetType, keyvaluedictionary properties);
UpdateTarget(string targetTypeId, keyvaluedictionary properties);
However, this does not provide much direction or insight as to what target types or properties can be created or updated.

This is a tedious to use interface and is very prone for a consumer to make errors. In one or more embodiments, because target types and properties are both user-defined, the API may allow for many possible inputs for the target type as well as any target property name/value pairs.

In a specific embodiment, an orchestrator may provide a per-type WSDL defining a specific interface using the then-present properties for the type. The API may become dynamic and changing according to changes to the type. In one or more embodiments, as a user defines new target types or adds new properties to these target types, the API may dynamically change to account for the new target types and new properties. Similarly, as target types or properties are deleted, the API target dynamically changes to account for the deleted target type or deleted property. Therefore, if a user has defined a new target type, for example 'Router', the API will have new methods created for the new target type and parameters that correspond to the user-defined properties.

The resulting API routines for the 'Router' may be:
CreateRouter(string name, int logLevel);
UpdateRouter([optional] string name, [optional] int logLevel);
The 'Router' has two properties, 'name', and 'logLevel', which are both specified in the routines. With the introduction of additional types, additional routines may be created, and with the introduction of additional properties, additional parameters to these routines may be created. The resulting API is explicit, intuitive, and easy for users to operate.

Figure 4:
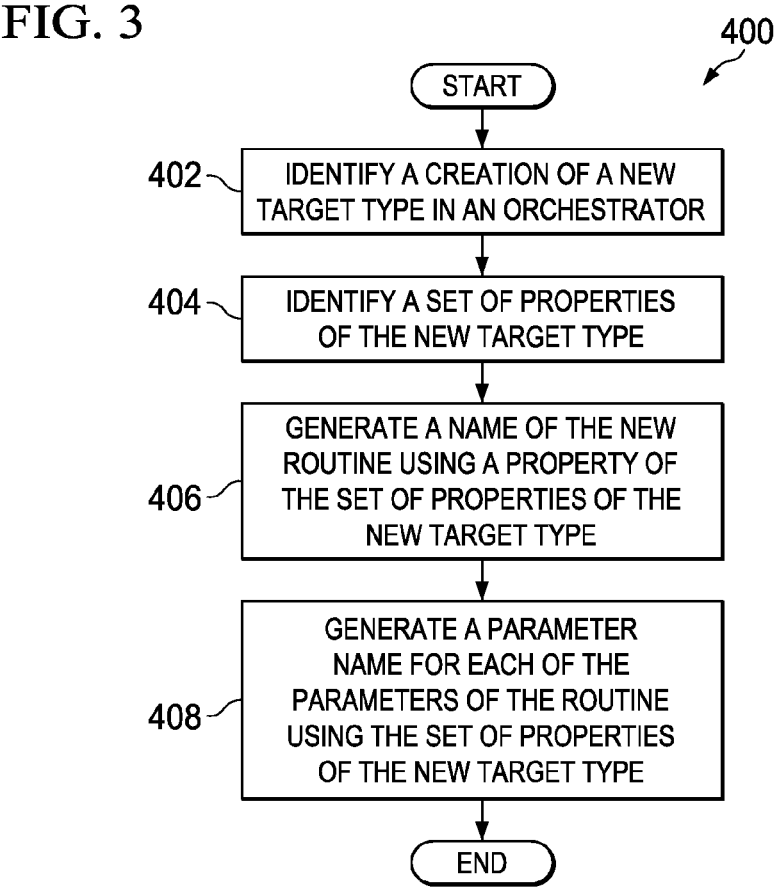
FIG. 4 is a simplified flowchart illustrating a method for managing a creation of a new target type in accordance with one example embodiment.

FIG. 4 is a simplified flowchart illustrating a method for managing a creation of a new target type in accordance with one example embodiment. A flow 400 may begin at step 402, where an API, generator module may identify a creation of a new target type. For example, the new target type may be a "Router." The new target type may be a user-defined target type or a core target type. The target type may be identified by receiving a user input, an update file, or in another manner. In a specific embodiment, the target type may be in a service-oriented architecture. The service-oriented architecture may include an API.

At step 404, the API generator module may identify a set of properties of the new target type (e.g., a name or log level). §At step 406, the API generator module may generate a name of the new routine using a property of the set of properties of the new target type. In this example, the name may, for example, "router." At step 408, the API generator module may generate a parameter of the new routine using a property of the set of properties of the new target type. In this example, a parameter may be, for example, a log level. In other embodiments, flow 400 may include other steps. For example, the API generator module may identify a removal of a new target type. In response to identifying the removal, the API generator module may remove the new routine of the API.

Figure 5:
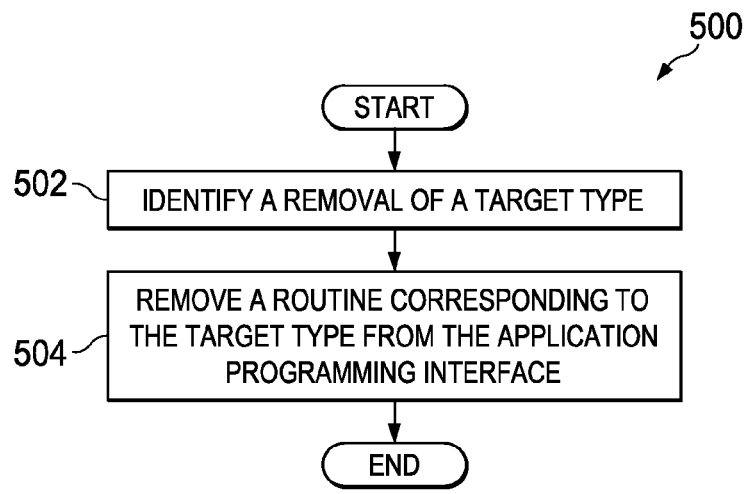
FIG. 5 is a simplified flowchart illustrating a method for managing a removal of a new target type in accordance with one example embodiment.

FIG. 5 is a simplified flowchart illustrating a method for managing a removal of a new target type in accordance with one example embodiment. A flow 500 may begin at step 502, where an API generator module may identify a removal of a target type. The target type may be a user-defined target type or a core target type. The target type may be identified by receiving a user input, an update file, or in another manner. In a specific embodiment, the target type may correspond to an IT service or an IT element that supports that service. The orchestrator then may include an API that corresponds to creation of targets of that target type. At step 504, the API generator module may remove a routine corresponding to the target type from the API.

Figure 6:
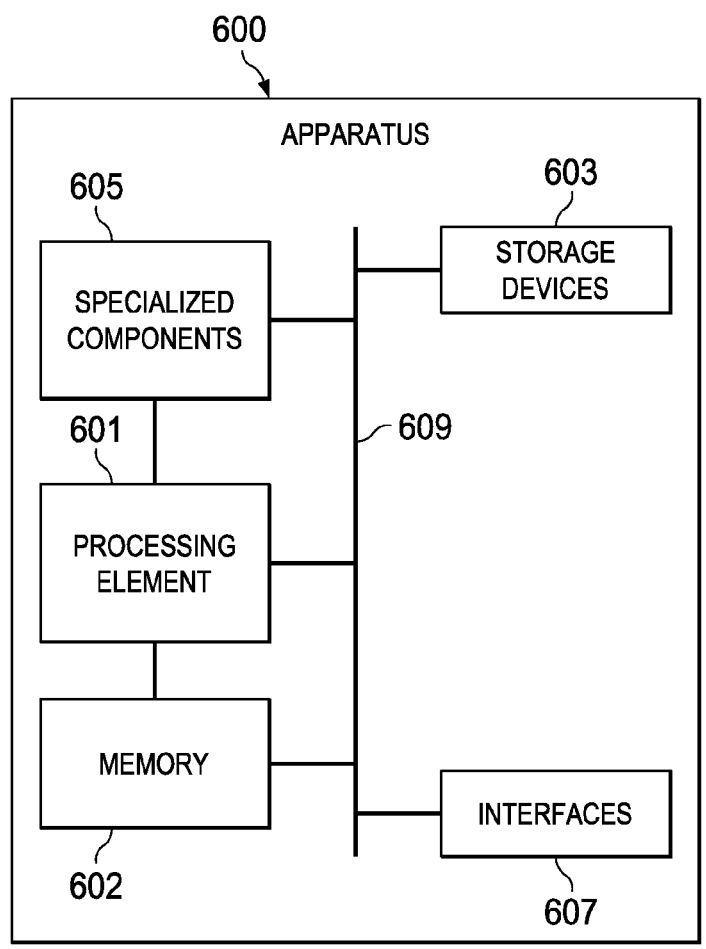
FIG. 6 is block diagram of an apparatus used in accordance with one example embodiment.

FIG. 6 is block diagram of an apparatus or component 600 used in accordance with one example embodiment. In one embodiment, apparatus or component 600 performs one or more processes corresponding to one of the flow diagrams and/or sequence of changes illustrated or otherwise described herein. In one embodiment, apparatus or component 600 includes one or more processing element(s) 601, memory 602, storage device(s) 603, specialized component(s) 605 (e.g. optimized hardware such as for performing operations, etc.), and interface(s) 607 for communicating information (e.g., sending and receiving packets, user-interfaces, displaying information, etc.), which are typically communicatively coupled via one or more communications mechanisms 609, with the communications paths typically tailored to meet the needs of the application. In one embodiment, apparatus or component 600 is part of the computing environment of FIG. 1.

Various embodiments of apparatus or component 600 may include more or less elements. Processing element(s) 601 using memory 602 and storage device(s) 603 typically controls the operation of apparatus or component 600 to perform one or more tasks or processes. Memory 602 is one type of computer-readable/computer-storage medium, and typically comprises random access memory (RAM), read only memory (ROM), flash memory, integrated circuits, and/or other memory components. Memory 602 typically stores computer-executable instructions to be executed by processing element(s) 601 and/or data that are manipulated by processing element(s) 601 for implementing functionality in accordance with an embodiment. Storage device(s) 603 are another type of computer-readable medium, and typically comprise solid-state storage media, disk drives, diskettes, networked services, tape drives, and other storage devices. Storage device(s) 603 typically store computer-executable instructions to be executed by processing element(s) 601 and/or data that are manipulated by processing element(s) 601 for implementing functionality in accordance with an embodiment.

In view of the many possible embodiments to which the principles of our disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. In addition, many different forms of data structures could be used in various embodiments. The disclosure as described herein contemplates all such embodiments as may come within the scope of the following claims and equivalents thereof.

In certain embodiments, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for managing an application programming interface, comprising:
    identifying a creation of a new target type in an orchestrator, which includes the application program interface and which executes a process;
    identifying a set of properties of the new target type, wherein the process has access to the set of properties; and
    generating a new routine in the application program interface for the process using the set of properties, which previously existed.

2. The method of claim 1, further comprising:
    creating a derived execution target subtype based on the new target type; and
    creating additional properties that would be accessible for the derived execution target subtype, wherein the derived execution target subtype maintains to the set of properties for the new target type.

3. The method of claim 1, wherein a new process that executes on the new target type can also execute on the derived execution target subtype.

4. The method of claim 1, wherein the generating the new routine in the application program interface using the set of properties comprises:
    generating a name of the new routine using a property of the set of properties of the new target type.

5. The method of claim 4, wherein the property is a name of the new target type.

6. The method of claim 1, wherein the new routine has a set of parameters; and wherein the generating the new routine in the application program interface using the set of properties comprises:
    generating a parameter name for each of the parameters of the routine using the set of properties of the new target type.

7. The method of claim 1, wherein the new target type is a user-defined target type.

8. The method of claim 1, further comprising:
    identifying a removal of the new target type; and
    removing the new routine of the application program interface.

9. The method of claim 1, further comprising:
    identifying a change in the set of properties of the new target type; and
    updating the new routine of the application program interface based on the change.

10. The method of claim 1, wherein the new routine that was generated using the set of properties has a different authorship from an original routine that previously existed and that included the set of properties.

11. A server, comprising:
    a processor;
    a memory element; and
    an application program interface generator module coupled to the processor and the memory element, wherein the application program interface generator module is configured to:

identify a creation of a new target type in an orchestrator, which includes the application program interface and which executes a process;
identify a set of properties of the new target type, wherein the process has access to the set of properties; and
generate a new routine in the application program interface for the process using the set of properties, which previously existed.

12. The server of claim 11, wherein the application program interface generator module is further configured to:
create a derived execution target subtype based on the new target type; and
create additional properties that would be accessible for the derived execution target subtype, wherein the derived execution target subtype maintains to the set of properties for the new target type.

13. The server of claim 11, wherein a new process that executes on the new target type can also execute on the derived execution target subtype.

14. The server of claim 11, wherein the application program interface generator module is further configured to:
identify a removal of the new target type; and
remove the new routine of the application program interface.

15. The server of claim 11, wherein the new routine that was generated using the set of properties has a different authorship from an original routine that previously existed and that included the set of properties.

16. One or more non-transitory tangible media encoding logic that includes instructions for execution and by a processor to perform operations comprising:
identifying a creation of a new target type in an orchestrator, which includes the application program interface and which executes a process;
identifying a set of properties of the new target type, wherein the process has access to the set of properties; and
generating a new routine in the application program interface for the process using the set of properties, which previously existed.

17. The media of claim 16, the operations further comprising:
creating a derived execution target subtype based on the new target type; and
creating additional properties that would be accessible for the derived execution target subtype, wherein the derived execution target subtype maintains to the set of properties for the new target type.

18. The media of claim 16, the operations further comprising:
identifying a removal of the new target type; and
removing the new routine of the application program interface.

19. The media of claim 16, the operations further comprising:
identifying a change in the set of properties of the new target type; and
updating the new routine of the application program interface based on the change.

20. The media of claim 16, wherein the new routine that was generated using the set of properties has a different authorship from an original routine that previously existed and that included the set of properties.

\* \* \* \* \*